Figure 1:
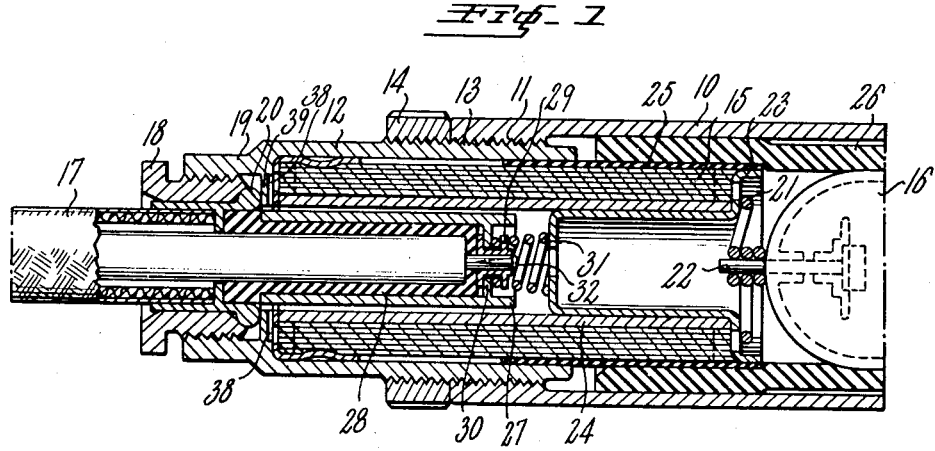

Oct. 25, 1949.   J. T. OSTERMAN   2,485,913
ELECTRIC CONDENSER
Filed Feb. 2, 1945

INVENTOR.
JOSEPH T. OSTERMAN
BY
Raymond A. Paquin
ATTORNEY

Patented Oct. 25, 1949

2,485,913

UNITED STATES PATENT OFFICE 2,485,913

ELECTRIC CONDENSER

Joseph T. Osterman, Northampton, Mass., assignor to American Bosch Corporation, Springfield, Mass., a corporation of New York Application February 2, 1945, Serial No. 575,874

3 Claims. (Cl. 175—41)

This invention relates to electric condensers and more particularly to tubular or hollow condensers of low or high voltage types for parallel circuit applications, wherein it is desired to reduce the space requirements to a minimum and still maintain adequate flash over distances such as in a radio-shielded harness lead assembly for ignition systems.

In past harness assemblies incorporating such condensers, the ground connection for the condenser comprised an undulating type of washer positioned between the end of the condenser and the wall of the condenser housing. However, axial expansion and contraction of the condenser prevented proper contact between the ground connection of the condenser and the condenser housing from being permanently maintained.

It, therefore, is the principal object of this invention to provide a condenser of the type set forth with means for permanently and positively grounding the condenser to the condenser housing regardless of any axial expansion or contraction of the condenser.

Another object of the invention is to provide new and improved means for sealing, insulating and moisture-proofing in its housing, a condenser of the type set forth.

Another object of the invention is to provide a condenser and housing construction wherein the condenser may be impregnated with an insulating material while in the housing, whereby the complete assembly may be impregnated.

Another object is to provide a condenser construction wherein the condenser may be impregnated with an insulating material, with the terminals in position on the condenser.

Other objects and advantages will be apparent from the following description taken in connection with the accompanying drawings of the preferred form of construction. It will be understood that many changes may be made in the details of construction and arrangement of parts thereof, without departing from the spirit of the invention as expressed in the appended claims. I, therefore, do not wish to be limited to the exact details of construction and arrangement of parts shown and described, as the preferred form has been shown by way of illustration only.

Figure 2:
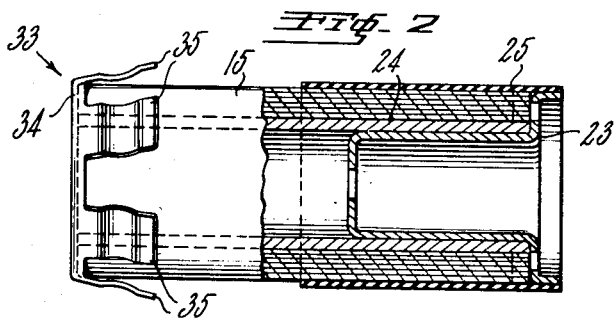
Figure 3:
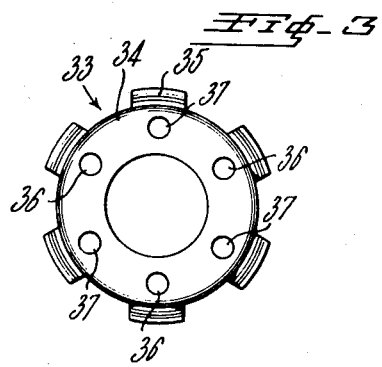

In the drawings:

Fig. 1 is a longitudinal section, partly in elevation, of a harness lead and condenser assembly constructed according to the invention; Fig. 2 is a longitudinal view, partly in section and partly in elevation, of the condenser of Fig. 1; and Fig. 3 is an end view of the condenser of Fig. 2.

Referring to the drawings, 10 designates the tubular metallic main housing of the harness lead assembly having an internally threaded portion adjacent one end thereof. The tubular condenser housing 12 is preferably formed of suitable metal and is provided with an exterior threaded portion 13 adapted to engage the interior threaded portion 11 on the main housing to retain the main housing 10 and the condenser housing 12 in assembled relation. The lock nut 14 is provided for locking the housings 10 and 12 in said assembled position.

Within the condenser housing 12 is positioned the tubular condenser 15, electrically connected to the spark gap 16 and the harness lead 17. The harness lead 17 is connected to the condenser housing 12 by means of the harness nut 18 which engages the internally threaded portion on the reduced end 19 on the condenser housing 12. The brass ferrule 20 is retained in position against the flange 39 by the harness nut 18.

The spark gap 16 receives current from the condenser 15 through the connecting spring 21 which is tightly wound on the spark gap rod 22, and makes contact through the positive terminal 23 of the condenser 15.

The condenser 15 shown embodying the invention is a two-plate condenser and is wound on a hollow sleeve or mandrel 24 of insulating material. The condenser 15 is formed of alternate layers of copper foil and mica and is of the roll type, that is it is formed by rolling alternate layers of copper foil and mica insulation material on the mandrel 24 as is well known in the art. If desired the insulation or dielectric layer may be formed of paper with oil impregnation or some other suitable dielectric such as fiber glass cloth with a silicon resin impregnation for high temperature application.

In order to properly position the condenser 15 in the housing, a tubular protector 25 is placed over the outer surface of the condenser so that it will be between the interior surface of the housing 12 and the outer surface of the condenser. This protector 25 is preferably formed of rubber or artificial rubber and is of such size that when it is placed over the condenser it will yieldingly engage the surface thereof and remain thereon. Within the housing 10 and surrounding the spark gap 16 and the adjacent end of the condenser 15, is the tubular high temperature boot 26 of rubber or the like for providing a sealed, insulated shock-proof mounting for the spark gap, and also sealing and moisture-proofing the parts within the housing 10.

Within the bore of the sleeve or mandrel 24 of the condenser 15, is the porcelain terminal 27 containing the adapter 28 of rubber or the like adapted to receive the end of the harness lead 17 which engages the eyelet 29 clamped to the flange 30 on the porcelain terminal member 27. The coil spring 31 is secured at one end to the eyelet 29 by a flange on the eyelet and has its opposite end engaging the positive terminal 23 of the condenser. Within the central opening in the eyelt 31 is the pin 32 which is pressed in to fan the cable core and secure the cable core in electrical contact with the terminal.

In order to form a ground connection for the condenser 15, the terminal or contact member 33 is provided. The terminal member 33 may be formed by pressing or stamping, and comprises an annular cap portion 34 adapted to fit over the grounded contact end of the condenser and make contact with the ground potential foil of the condenser 15, and is provided with the integral spring levers 35 circumferentially spaced around the periphery of the cap portion 34. When the condenser equipped with the terminal member 33 is placed in the housing, it will be seen that the spring levers 35 circumferentially spaced as shown will be compressed by the bore of the condenser housing 12 on all sides of said housing with no regard to the axial location of the condenser, such as would be the case where the ground connection of the condenser is formed by an undulating type of washer as previously used, as described above, and axial expansion and contraction is thereby no longer a factor as in said prior type constructions.

The number and axial location of the spring levers 35 on the terminal member 33 may be varied as desired, but six such levers circumferentially spaced have proven entirely satisfactory.

In order to allow securing of the terminal 33 to the condenser 15, the cap portion 34 is provided with openings 36 of desired number and size and through these openings solder may be inserted to secure the terminal 33 in position on the condenser 15 and in electrical contact with the ground potential foil of the condenser.

Also openings such as 37 are provided through the cap portion 34 to allow the impregnation of the condenser 15 with oil or other suitable insulating material such as a silicon resin after the condenser has been completely formed.

While the openings 36 for soldering the member 33 to the condenser 15 and the openings 37 may be of desired number and spacing, I have found three of each of these openings with alternate openings for each purpose to provide a satisfactory construction.

In order that the condenser 15 may be impregnated while in the housing, the slot or groove 38 is provided in the flange in the condenser housing 12. This slot or groove 38 forms a passageway for the impregnating material when the condenser is assembled in its housing, and this construction is desirable particularly when the impregnating material is of a silicon type resin which is particularly adapted for high temperature application. Where this high temperature impregnant is applied, it is apparent that the solder employed for connecting the terminal member to the condenser be of an alloy of sufficiently high melting point as to permit the proper heat treating or baking for the impregnant without disturbing the soldered connections of the terminal to the condenser.

In the use of the present invention, the condenser 15 is formed as previously described and the ground terminal member 33 is formed as by pressing or stamping. Terminal 33 is then positioned over an end surface of the condenser and soldered in position in electrical connection with the ground potential foil of the condenser.

The condenser 15 may then be impregnated, or this may not be done until after the condenser has been positioned within the housing.

The condenser is then positioned within the housing with the ground terminal 33 engaging the flange 39 on the housing 12 and making contact therewith, although this is not critical because of the engagement of the spring levers 35 on the wall of the housing 12 through which the condenser is grounded to the housing without any trouble due to axial expansion of the condenser as was encountered with the undulating washer ground construction.

With the present construction, a permanent ground connection is maintained between the condenser and housing at all times and any movement of the condenser within its housing does not interfere with the electrical performance of the condenser.

From the foregoing it will be seen that I have provided simple, efficient and economical means for obtaining all of the objects and advantages of the invention.

Having described my invention, I claim:

1. A tubular condenser including a body portion having an axial opening therethrough, and a terminal member therefor, said terminal member comprising an annular contact portion secured in contact with an end of said body portion with the opening in said annular portion aligned with the opening in said condenser and said terminal member having a plurality of spaced spring lever contact portions extending from the periphery of said annular portion and a second terminal member secured to the opposite end of said body portion and having a portion extending into said axial opening in said body portion for electrical connection with a lead extending into said axial opening through the annular opening in said first terminal member.

2. A tubular condenser including a tubular body portion having an axial opening therethrough, a terminal in said axial opening and an annular terminal member for said condenser, said annular terminal member comprising a portion secured in contact with an end surface of said condenser and having a plurality of spaced spring lever contact portions, said terminal in said axial opening having a portion secured to the end of said condenser opposite said annular terminal member and having a contact portion adjacent an end of said body portion and a contact portion in said axial opening for electrical connection with a lead extending into said opening in said annular terminal member.

3. In a device of the character described, a pair of tubular members, means for securing said tubular members in aligned relation to form a hollow housing for supporting a tubular condenser, a tubular condenser in said hollow housing, one of said tubular members having an opening for allowing the passage therethrough of an electrical lead for electrical connection with said condenser, said tubular member having a flange adjacent the end of said condenser, an opening in said flange communicating with said condenser for permitting the passage therethrough of a fluid insulating material for impregnating said condenser while said condenser is in said housing and a member secured to said tubular member adjacent said flange for securing said lead in electrical connection with said condenser and preventing escape of said insulating material.

JOSEPH T. OSTERMAN.

REFERENCES CITED

The following references are of record in the file of this patent:

UNITED STATES PATENTS

| Number | Name | Date |
| --- | --- | --- |
| 1,116,013 | Casper | Nov. 3, 1914 |
| 1,175,343 | Conrad | Mar. 14, 1916 |
| 1,624,951 | Holthouse | Apr. 19, 1927 |
| 1,850,105 | Higginbottom | Mar. 22, 1932 |
| 1,904,805 | Selling | Apr. 18, 1933 |
| 2,064,819 | Burlingame | Dec. 22, 1936 |
| 2,304,764 | McAllister | Dec. 8, 1942 |
| 2,323,124 | Edmundson | June 29, 1943 |
| 2,397,551 | Leno et al. | Apr. 2, 1946 |
| 2,398,635 | Harkness | Apr. 16, 1946 |